April 25, 1961  W. J. FLEMMING  2,981,209
COMBINATION RAIL-HIGHWAY FREIGHT AND AUTO TRANSPORT
Filed Nov. 8, 1955  5 Sheets-Sheet 1
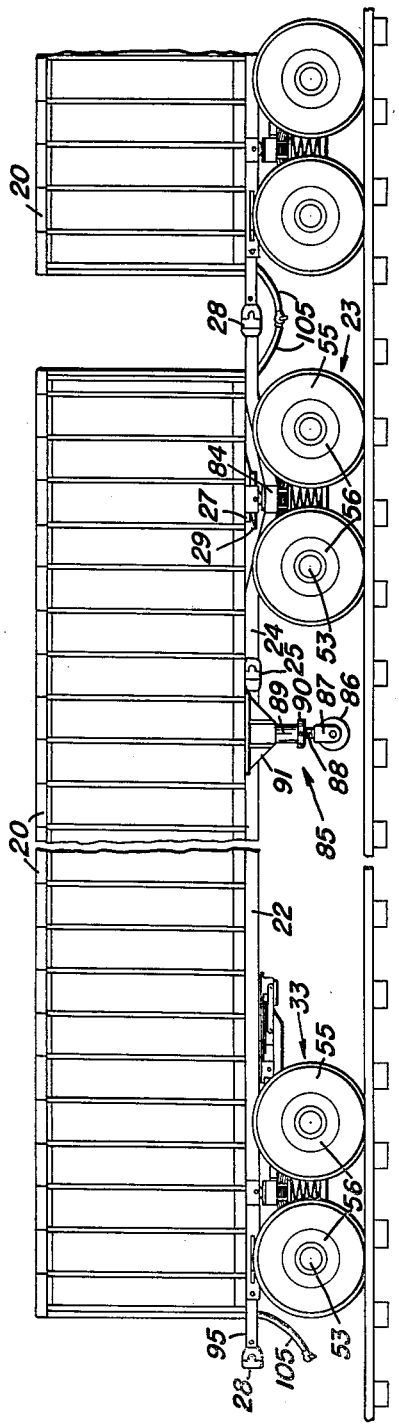
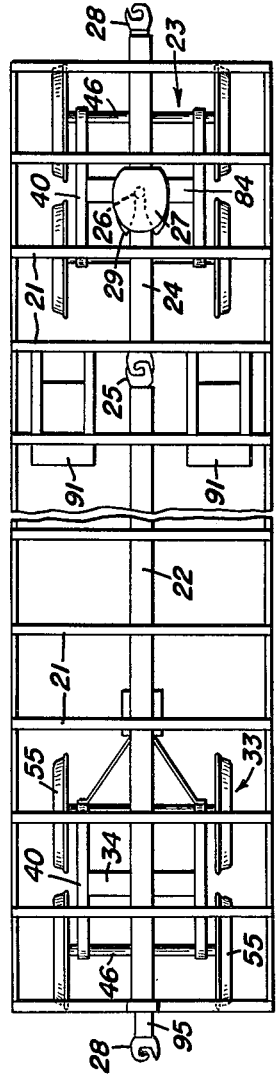
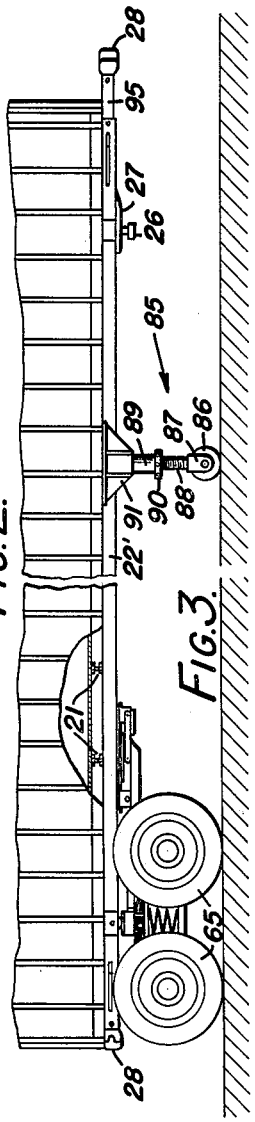
INVENTOR.
WALTER J. FLEMMING
BY
ATTORNEY

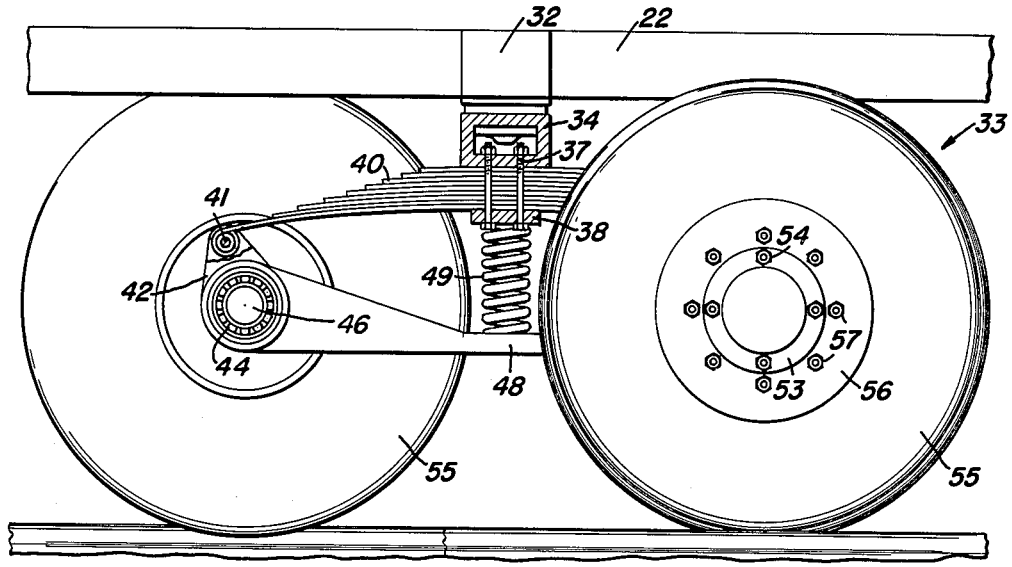
FIG.4.
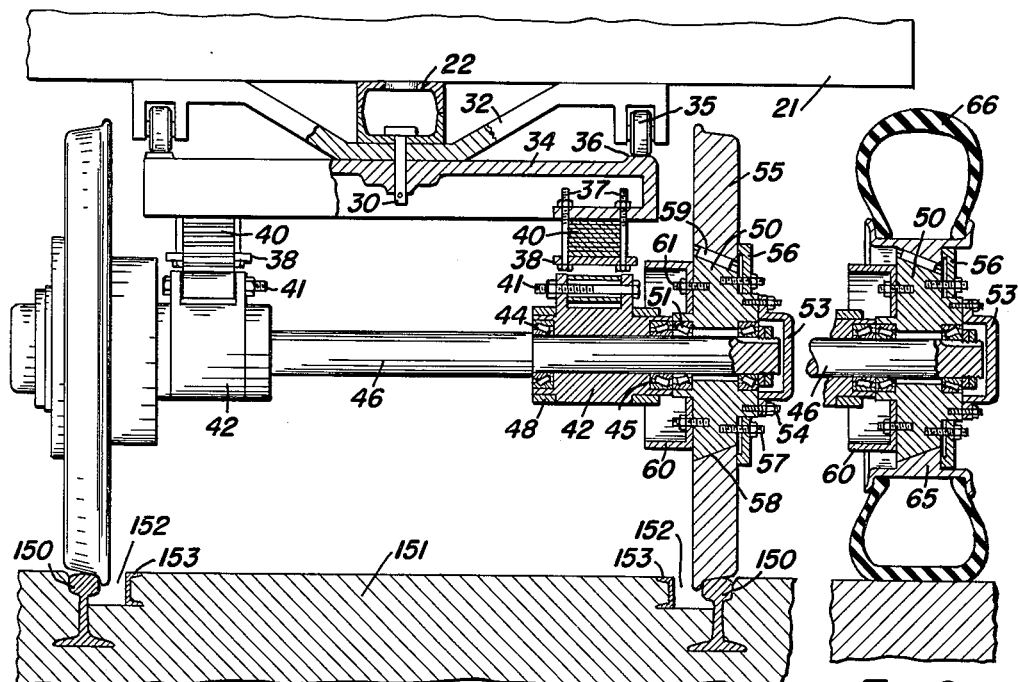
FIG.5.
FIG.6.
INVENTOR.
WALTER J. FLEMMING

April 25, 1961  W. J. FLEMMING  2,981,209
COMBINATION RAIL-HIGHWAY FREIGHT AND AUTO TRANSPORT
Filed Nov. 8, 1955  5 Sheets-Sheet 4
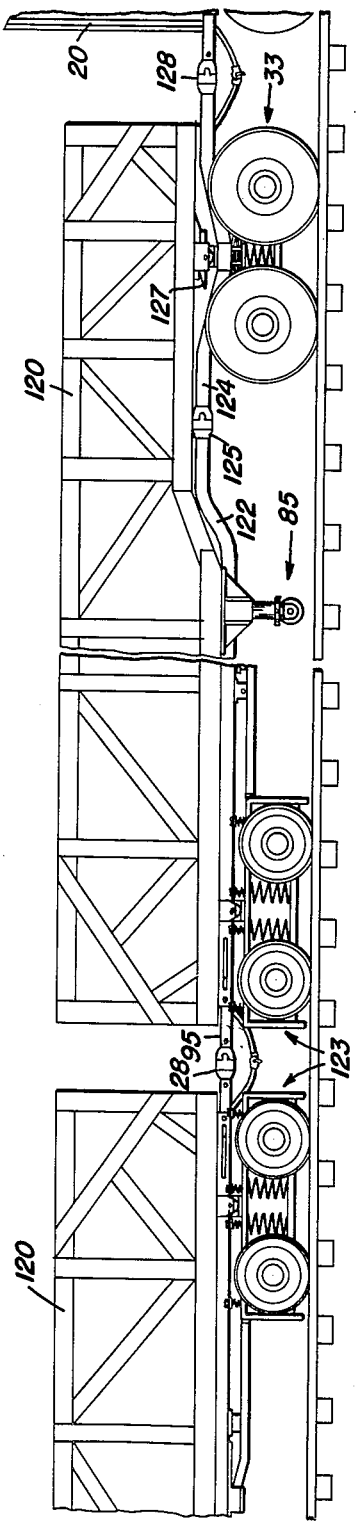
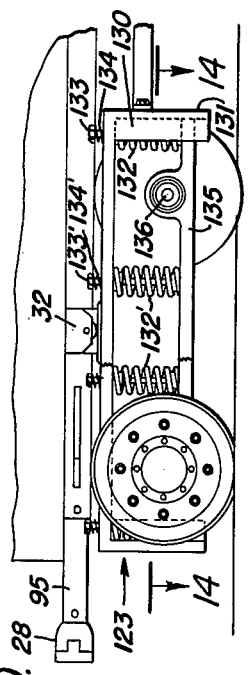
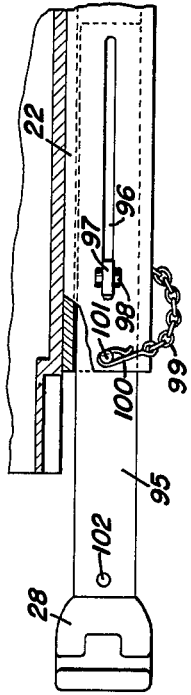
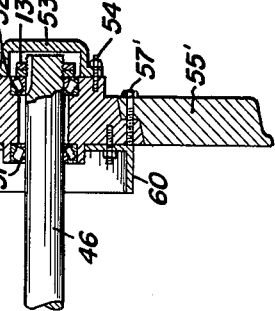
INVENTOR.
WALTER J. FLEMMING
BY
ATTORNEY

INVENTOR.
WALTER J. FLEMMING
BY
ATTORNEY

United States Patent Office 2,981,209
Patented Apr. 25, 1961

2,981,209
COMBINATION RAIL-HIGHWAY FREIGHT AND AUTO TRANSPORT

Walter J. Flemming, Hilton, N.Y.
(51 Oakman St., Rochester 5, N.Y.)

Filed Nov. 8, 1955, Ser. No. 545,623

9 Claims. (Cl. 105—215)

The present invention relates to combination rail and highway freight and automobile transport vehicles.

At present freight, including automobiles, may be transported either over railroads on rail cars or over the public highways on motor trucks. For short distance hauling for say up to 100 miles individual highway units are obviously more economical. On the other hand, for long distance hauling of freight the railroads have definite advantages, included among them being greater safety, and the saving in power costs. On a railroad a single power unit pulls a number of loads of freight. Moreover, railroad mileage is generally shorter than the highway mileage between two distant points, and railroad freight can be hauled over a long distance at greater speeds than over the highways because highway vehicles require continuous accelerations and decelerations on hills, and curves and because of traffic obstructions, and the many complete stops required by traffic lights and other traffic controls. Because of taxes, and maintenance and right-of-way costs rail shipment charges have risen so high, however, that more and more goods are being transported on the public highways. Conventional railway shipping, moreover, lacks the flexibility of truck shipping. Recently, though, the railroads have sought to win back some of the freight business previously lost to the truckers by loading the trailers of tractor-drawn freight transports on flat cars, and moving them from point to point by rail. In all cases, however, railroad transportation heretofore has involved the loading and unloading of goods or of trailers onto railroad freight cars, and of highway transportation from the point of shipment to the point of loading and from the point of loading to the point of delivery of the shipment.

A primary object of the present invention is to provide transportation equipment which can be readily converted from highway to railroad use, and vice versa, thereby to take advantage of the railroad mass transportation economies, safety, and speed, and also to take advantage of the individual highway vehicle flexibility, convenience, and economies. To this end a further object of the invention is to provide a vehicle which can be converted from highway to rail use merely by changing the rims of the wheels to replace steel railway tires with rubber tires for highway use, and vice versa.

Another object of the invention is to provide an improved body construction for a combination vehicle of the type described in which the stringers are centralized so as more readily to take the stress from pulling as well as more readily carrying the weight of the load.

Another object of the invention is to provide a combination highway and rail vehicle with a lower suspension running gear.

Another object of the invention is to provide a combination highway-rail vehicle with a telescoping coupler that will not add any dead length when it is used on the highway.

Another object of the present invention is to provide a vehicle which may be used either on the highway or on the railroads for transporting automobiles in which end loading of the automobiles for rail transport is possible.

Another object of the invention is to provide a combination vehicle for use in transporting automobiles over the highway or on rails which will permit end loading of the automobiles and yet enable proper clearance between successive cars by reversing the cars so as to keep standard coupler height.

In the drawings:

Fig. 1 is a side elevation showing fragmentarily two coupled freight transport vehicles made according to one embodiment of this invention and mounted for rail transportation;

Fig. 2 is a plan view of the chassis of one of the cars of Fig. 1;

Fig. 3 is a fragmentary side elevation of a car constructed according to a modification of this invention, the car being shown in parked position and converted for use on the highways;

Fig. 4 is a side elevation with parts broken away and on an enlarged scale, showing the spring suspension of the vehicle of Figs. 1 to 3 inclusive;

Fig. 5 is a part end elevation, part axial section further illustrating the spring suspension of the vehicle;

Fig. 6 is a fragmentary axial section showing the rim of one of the wheels of the rail vehicle removed and an automotive rim and a pneumatic tire substituted therefor;

Fig. 10 is a fragmentary side elevation showing how two automotive transport vehicles made according to this invention may be coupled in reverse relationship for rail transport;

Fig. 11 is an axial sectional view showing a wheel mounting different from the wheel mounting of Fig. 5;

Fig. 12 is a side elevation of a different form of spring suspension from that previously illustrated;

Fig. 13 is a fragmentary side elevation on an enlarged scale, with parts broken away, showing a telescoping coupling member such as used in coupling together two vehicles made according to the present invention;

Figure 7:
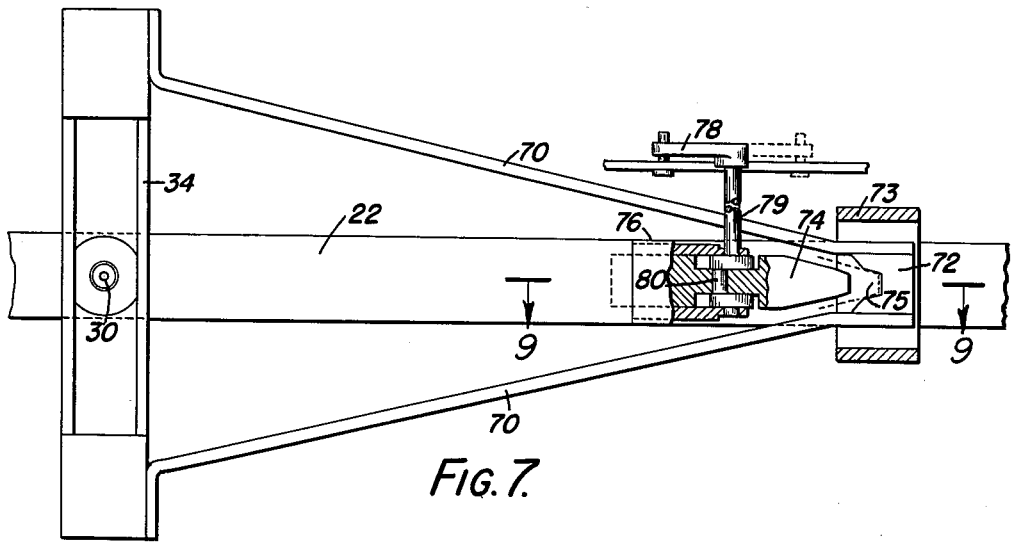
Fig. 7 is a fragmentary bottom plan view, with parts broken away, further illustrating the mounting of the vehicle and how it may be locked to or unlocked from the central stringer for highway and rail use, respectively.

With the present invention, a tractor-drawn highway vehicle is constructed so that it can be used directly on rails. All that is required is to remove the rims of the wheels and the pneumatic tires from the rear wheels, to substitute, steel tires therefor, to uncouple the front end of the vehicle from the tractor and to couple the front end of the vehicle instead to a four-wheeled rail dolly. The vehicle is then ready to roll on the rails. To convert it back for highway use at the end of the rail trip, the steel rims are removed from the rear wheels and automotive rims carrying pneumatic tires are substituted therefor, the front of the vehicle is uncoupled from the rail dolly and coupled to the road tractor.

Referring now first to Figs. 1 and 2, 20 denotes the body of the vehicle which is here shown similar to a freight car or highway trailer transport trailer and which may be made of steel or wood or other suitable material. The body is secured by bolting or in any other suitable conventional manner to cross bars 21 which in turn are bolted or otherwise secured to a beam or draw bar 22 that extends for only about two-thirds of the length of the vehicle. When the vehicle is used on rails drawbar 22 is coupled to the drawbar 24 of a removable rail dolly 23, by a conventional rail coupling 25. The short draw bar 24 is bent downwardly intermediate its ends so as to extend beneath and in spaced relation to a conventional coupling plate 27 which is secured to the bottom of the vehicle body and which is adapted to hold the pin 26 by means of which the vehicle may be coupled to a conventional automotive tractor for highway transport of the vehicle. The long and short coupling bars 22 and 24 are provided at their distal ends with coupling members 28 by which they may be coupled to adjoining cars or vehicles 20 of a train.

The removable dolly 23, of which the short coupling bar 24 forms a part, is adapted to be removed when the vehicle is converted from rail to highway use. This dolly comprises a forked plate 29 which engages the coupling pin 26 and which is supported by the drawbar 24.

The vehicle is supported by the dolly 23 and a rear truck 33 when it is being used on a railroad. It is supported by the rear truck 33 and a conventional highway tractor when it is being used on the highway.

The long draw bar 22 may be hollow and formed of two U-shaped channel members that are welded together as shown in Fig. 5. A pivot pin 30 pivotally connects this drawbar with a transverse strap 32 and with the transverse bar 34 of the rear truck 33. The strap 32 has rollers 35 journaled in it at opposite ends which ride on hardened surfaces 36 on the upper side of the bar 34. Secured to the bar 34 by bolts 37 (Figs. 4 and 5) and straps 38 are leaf springs 40 which are connected at opposite ends by pins 41 to shackles 42 that are mounted by means of opposed taper roller bearings 44 and 45 on the twin axles 46 of the rear truck 33. A pair of hubs 50, which are adapted to carry wheel rims, are journaled on each of the axles 46 at opposite ends thereof by opposed taper roller bearings 51 and 52 (Figs. 5 and 11).

The hubs 50 are generally frusto-conical in shape. When the vehicle is mounted on rails, flanged steel tires 55 of conventional shape are secured to the hubs 50 by plates 56 and bolts 57. The ends of the axles 46 are sealed by caps 53 that are secured to the hubs by screws 54. Brake drums 60 that are fastened to the insides of the hubs by bolts 61 serve both for rail and highway use. A key 59 (Fig. 5) serves to prevent rotation of the rims 55 and 65 relative to the hub 50. Any other suitable means may be used for this purpose. For instance, the hub may have a flat portion on its periphery to engage a complementary flat portion in the bore of rim 55 or of rim 65.

Supported on each pair of front and rear shackles 42 is an H-shaped support member 48 whose cross-bar serves to support a coil spring 49 that is interposed between the support member and the plate 38 of the associated leaf spring 40.

For highway use, the flanged tires 55 are removed and flanged rims 65 (Fig. 6) are substituted therefor, which carry pneumatic tires 66.

Figure 9:
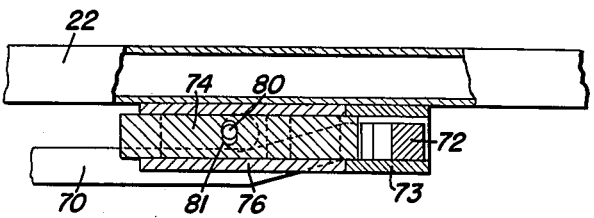
Fig. 9 is a fragmentary section on the line 9—9 of Fig. 7 looking in the direction of the arrows.
Figure 8:
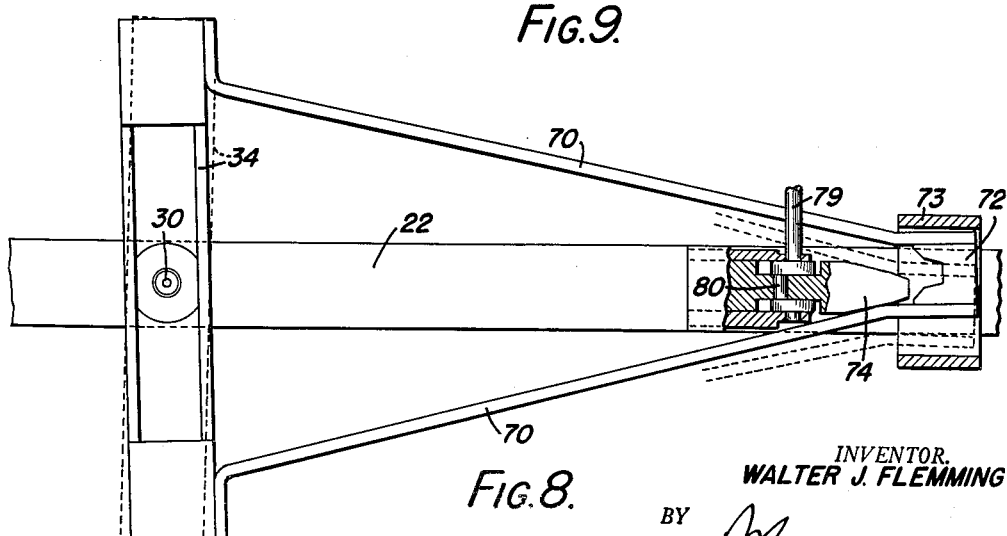
Fig. 8 is a bottom plan view, similar to Fig. 7, but showing how when the yoke is unlocked from the stringer the wheels are free to turn as required on the railroad.

The cross bar 34 has strap members 70 (Figs. 8, 9 and 10) welded or bolted to its front face which converge forwardly toward one another and which carry at their front ends a female coupling member 72 that is welded or otherwise secured to the strap members. This coupling member is adapted to move laterally in a socket or keeper 73 which is welded to the underface of the draw bar 22.

A male wedge-shaped member 74 is adapted to engage in the socket 75 of the female member 72 to secure the truck 33 against pivotal movement. The male member 74 is slidably mounted in a guide sleeve 76 which is welded to the underface of the draw bar 22. The male member 74 is moved into and out of engagement with the female member 72 by rotation of an arm 78 (Fig. 7 which is secured to a shaft 79 that is journaled in the guide sleeve 76 and that has an eccentric throw portion 80 which engages in a slot 81 in the bar 74.

For the highway the bar 74 is moved into locking engagement with the female member 72 to prevent pivotal movement of the rear truck 38 of the vehicle. This position is shown in dotted lines in Fig. 7. For railway use, the male member is moved to the full line position shown in Fig. 7 to disengage it from the female member 72 and permit free swinging movement of the rear truck 33 of the vehicle as the train moves around curves, as illustrated in dotted lines in Fig. 8.

When the vehicle is being used on a railroad, as previously stated the front end of the vehicle is supported by the dolly 23. The drawbar 24 has a transverse bar 84 welded to it which is carried by a spring suspension and wheels 55 in the same way as the transverse bar 34 of Figs. 4 and 5.

To support the front end of the semi-trailer when detached from its truck or tractor, or while detaching the semi-trailer, a retractable gear denoted at 85 (Figs. 1 and 3) is provided. This retractable gear can be of any usual or conventional type, such as now employed with highway semi-trailers, and may include two separate rollers 86, each journaled in a forked member 87 that is carried by the threaded rod 88 which is adjustable in a keeper 89 by means of a nut 90. Each keeper may be secured to or be integral with a part 91 which is fastened to the framework of the semi-trailer.

The rear coupling member 28 may be formed integral with or secured to a bar 95 (Figs. 1 and 13) which has telescoping connection with the draw bar 22. For highway use, the coupling member is retracted to lie beneath the body of the semi-trailer. For railway use, the coupling member is extended so as to enable successive semi-trailers to be coupled together. For the telescoping adjustment, the draw bar 22 is provided with an elongate slot 96 and the coupling bar 95 telescopes within the draw bar 22 and has an eye portion 97 that extends laterally through this slot. A pin 98, that extends through eye 97, serves to prevent lateral movement of the bar 95 in the drawbar. A pin 101 that is secured to chain 99, by a snap hook 100, is provided to hold the coupling bar 95 in the extended position shown in Fig. 13 or in the retracted position shown in Fig. 3. The pin 101 is adapted to be inserted selectively in one of two longitudinally-spaced holes 102 in the bar 95. Chain 99 is secured to draw-bar 22.

Air hose 105 (Fig. 1) is provided to permit connecting several semi-trailers together with an air brake system when they are used on rails.

Fig. 3 shows a modification of the invention in which the draw bar 22' extends for the full length of the vehicle and has telescoping members 95 connected with it at both ends. Otherwise, the structure is similar to that disclosed in Figs. 1 and 2, and similar reference numerals are used to indicate similar parts in the several figures.

In Fig. 3 however, the semi-trailer is shown disconnected from the tractor and from the front truck 23. The landing gear 85 is shown lowered into operative position and the rear wheels are shown rubber tired. The vehicle has either completed a highway run and is waiting to be converted for rail use, or it has completed a rail run and is converted for highway use, awaiting now only its tractor.

As previously stated, in Fig. 2 the center reach or drawbar 22 extends only approximately ⅔ of the length of the unit. When it is joined for rail use by a coupler or other means 25 to an extension 24 of the reach mounted on the dolly 23, that extends the length of the unit. The fifth wheel 29 supported by the dolly does not lock onto the king pin 26, but the king pin slides into a slot of the fifth wheel. This slot serves to guide the unit. Any strain from pulling is on the reach 22; and when converting to highway use, the dolly 23 and that part 24 of the reach attached to it, is detached from the unit to make room for the highway tractor.

Automobile transports built according to one embodiment of this invention are illustrated in Fig. 10. These transports may have framework of conventional construction indicated at 120 for carrying the automobiles. The front ends of these transports are raised, as compared with the rear ends, as in conventional automobile transport. The draw bar for this automobile transport is preferably made in two parts, the rear section being denoted at 122 and the front section at 124. The two parts are coupled together with a standard coupling 125. The rear part of each transport is supported by a conventional truck 33 such as previously described. The draw bar section 124 is bent downwardly intermediate its ends to clear the coupling plate 127. This construction permits of the coupling 128 being at the standard height so that an automobile transport may be coupled to other transport semi-trailers 20 for rail use. The drawbar 122 also is bent downwardly intermediate its ends; and at its rear end the drawbar 122 carries a telescoping coupling member 95 similar to that previously described, which is, however, at a lower height than the coupling member of a standard trailer. However, automobile transport semi-trailers may be coupled together by reversing them, the rear ends of two successive automotive semi-trailers being coupled together for rail use, as shown in Fig. 10. This means reversing one automobile transport semi-trailer with reference to the other.

Figure 14:
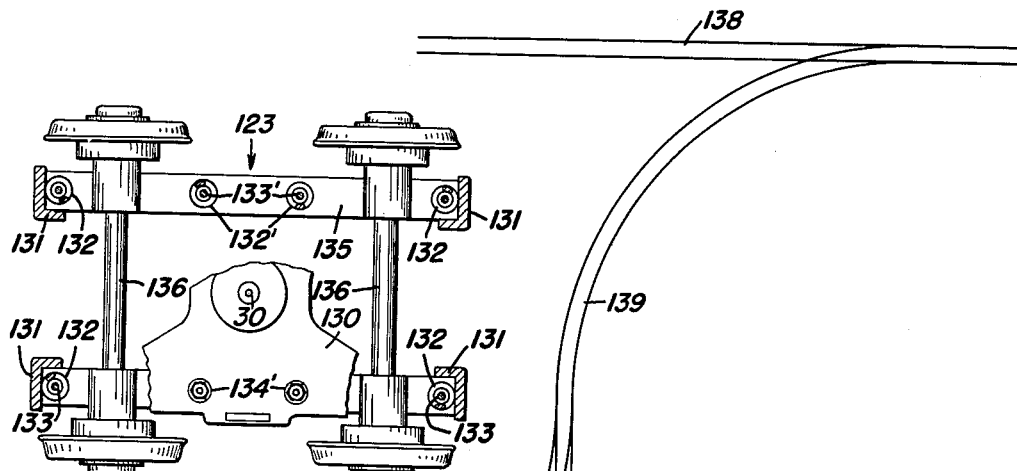
Fig. 14 is a plan view of the spring suspension of Fig. 12.

Preferably the rear ends of automotive semi-trailers are supported on trucks such as shown in Figs. 12 and 14. Here the transverse bar is of X-shape as shown fragmentarily at 130 in plan in Fig. 14. It is pivotally connected by a pin 30 with a transverse bar 32 like that shown in Fig. 5. It has four depending portions 131 which partially enclose four coil springs 132. These springs are mounted around bolts 133 which are supported by small coil springs 134 from the carrier 130, and the lower ends of the springs 132 seat against spacer members 135 which are journaled by anti-friction bearings on the wheel axles 136. There are two of these bars or axle spacers 135, one at each side of each truck. Between the wheels there are additional coil springs 132' supported from the carrier 130 on the bars 135 by bolts 133' and coil springs 134'.

The spring suspension shown in Fig. 12 may be coupled with smaller wheels to allow a lower suspension of the offset reach. It is a suspension with fewer parts and simpler, with only two cross pieces that are each equipped with axle and bearing openings, and a cover piece supported by coil springs acting as the bottom bolster.

The construction shown in Fig. 10 furnishes the opportunity for a lower rear end for the automobile transport; and by positioning one auto transport forward and the next backward, etc., it is possible to load and unload the automobiles more easily. Moreover, this makes possible greater height clearance, and yet keeps to a standard coupler height.

An alternative construction of wheel is shown in Fig. 11. Here the hub 50', which is journaled on the axle 46 by bearings 51 and 52, is provided with a stepped peripheral surface having two conical portions 58', 58". The rims 55', which are to be secured thereto, are provided with complementary mating stepped internal conical surfaces. In Fig. 11 the rim shown is for rail use. The rims are secured to the hub portion 50' by bolts 57'. As before the hub has a brake drum 60 secured to it which may be of conventional construction; and the hub has a cap 53 secured to it to cover the end of the axle and protect the bearings against grit and dirt. In the embodiment shown in Fig. 11, the studs go into the rim 55' as well as the wheel hub 50'. A nut and lock nut, denoted together at 138, hold the entire assembly on the axle. This is then covered by a cap 53.

Figure 15:
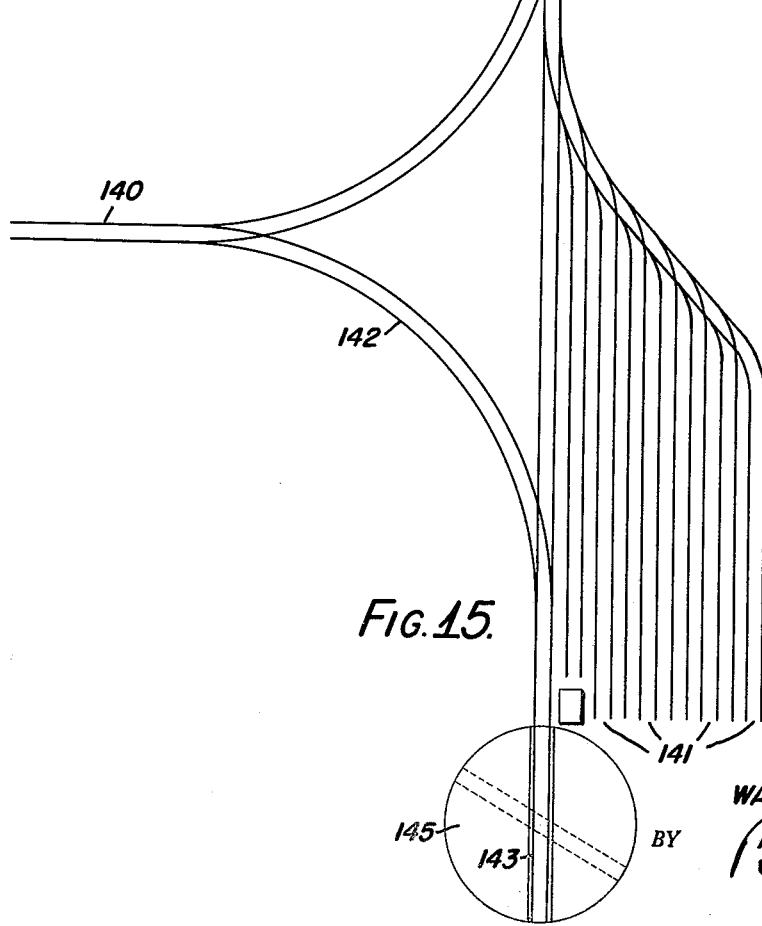
Fig. 15 is a plan view of the layout of a railroad yard showing an arrangement which will permit quick and easy conversion of a vehicle from railroad to highway use and vice versa.

For convenience in converting the semi-trailers from highway use to railroad use, I preferably provide at transfer points railroad converting yards such as illustrated diagrammatically in Fig. 15. The lines 138 designate a main line of the railroad. 139 is a spur off the main line; and 140, 142 are tracks constituting a Y for reversing cars. Track 139 connects with Y 142 and also with the track 143 on a turntable 145; and a series of spurs 141 also connect with track 139. A car may be run off of the main line onto spur 139 and then onto the turntable 145 for removal of a dolly 23 and coupling of the semi-trailer to a tractor. Vice versa, a tractor may back up a semi-trailer onto the turntable; and the semi-trailer may then be uncoupled from the tractor, and while the gear 85 and the rear truck of the rear semi-trailer are supporting the semi-trailer, the dolly 23 may be connected to the semi-trailer, and then by jacking up the rear wheels, the rims 65 and pneumatic tires 66 may be removed and the steel rims 55 may be substituted therefor. By removing the rims, the part which wears is removed so that there is always good fit all times. If the rubber tire were put on the wheel tread, the tread would wear, ultimately producing a sloppy fit.

One of the features of the converting yard is the fact that, as shown in Fig. 5, the road bed between the rail tracks 150 is filled with concrete or asphalt 151 to the same level as the concrete or asphalt of the rest of the yard so that trucks can readily be driven across the yard. Clearance may be provided for the flange portions of the railroad wheels, as indicated at 152 in Fig. 5, rails 153 being embedded in the concrete to prevent it being broken down.

This structure permits ready conversion of the units from rail to highway use; and an ordinary farm tractor may be used to move and switch these lighter and smaller semi-trailers which are preferably mounted, as described, on ball or roller bearings, in a matter of seconds compared to the hours and minutes required to switch conventional railroad cars with a conventional switching locomotive and crew. Thus a material saving in costs of switching is achieved.

An auto transport may be used on the highway providing it carries only four automobiles. If it carries six automobiles, it is too long for highway use and can only be used on rails. Today automobiles are transported in box cars. With the construction of the present invention it is easier to load and unload; and more automobiles can be transported per unit.

The end loading and unloading of automobiles can be accomplished at the yards; or the auto transports may be used for rail only, if the overall length is too long for highway use or for other reasons. The turntable arrangement enables the reversing of cars while loading or switching.

With a truck such as shown in Figs. 4 and 5, the main support for the semi-trailers is centered on the center reach, center sill, or T-beam 22. This construction is commonly used in railway equipment today, but not in highway freight equipment. The highway trailer commonly used has either a stringer or support above the left wheels approximately ¾ of the length of the trailer or less, and the same above the right wheel or wheels. This furnishes the main support for the complete unit. With the present invention the weight is concentrated on the center draw bar, thus enabling the main support to be carried at the king pin above the trucks or running gear, and on the tractor at the front for highway purposes. The center draw bar will also take the burden of drawing a number of these units in tandem on the rails. In this case the dolly, which on the rail supports the front end, locks onto the king pin in a conventional manner to convert for highway use. This dolly supports the fifth wheel and when converting for highway use is rolled to one side so that a highway tractor may take its place.

The design of a railroad truck or running gear shown in Figs. 4 and 5, with the journal boxes and brake inside, makes changing of the rail flanges to highway pneumatic tires, and vice versa, easy and practical. By using a support between each axle, and auxiliary coil springs it is possible to increase the size and weight of the leaf springs mounted on the offset shackles 42. The combination of offset shackles 42 working against the spring supporting roller or ball bearings on the wheels and in the wheel journals, and the design of the journals and the wheel bearings side by side, permits a smaller, lighter axle. The wheel bearings will also eliminate wheel scuff on the tracks, as well as on the highway which is a drawback of conventional railway car mountings where the wheels are pressed on the axles. No brake design is included in the structure shown but either expandable or contractable brakes may be used, or a combination of the two.

While the invention has been described in connection with several different embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains, and as may fall within the scope of the invention or the limits of the appended claims.

Having thus described my invention what I claim is:

1. A convertible highway-railroad vehicle, comprising a semi-trailer including a frame, a beam extending centrally, longitudinally of said trailer beneath said frame and on which said frame is supported, an axle for carrying at opposite ends selectively a pair of flanged railroad wheel rims and a pair of highway-type pneumatic tire holding rims, means connecting said axle to said beam adjacent the rear of said vehicle for pivotal movement about a vertical axis, and means connecting said trailer selectively to a highway tractor and to a railroad wheel truck adjacent the front end of the vehicle for pivotal movement also about a vertical axis, and means for locking said axle against pivotal movement relative to said beam.

2. A convertible highway-railroad vehicle comprising a semi-trailer including a frame, a beam extending longitudinally centrally of said trailer beneath said frame and on which said frame is supported, coupling members telescopically connected to opposite ends of said beam for coupling the vehicle at opposite ends to other vehicles, an axle mounted adjacent one end of the vehicle and pivotally connected to said beam for pivotal movement relative thereto about a vertical axis, said axle being adapted to carry selectively a pair of flanged railroad wheel rims and a pair of highway-type pneumatic tire holding rims, and means carried by said beam adjacent the other end of the vehicle for pivotally connecting the vehicle selectively to a highway tractor and to a railroad truck, said truck comprising at least one axle carrying at opposite ends a pair of flanged railroad wheels.

3. A convertible highway-railroad vehicle comprising a semi-trailer including a frame, a beam extending longitudinally centrally of said trailer beneath said frame and on which said frame is supported, an axle mounted adjacent one end of the vehicle and pivotally connected to said beam for pivotal movement relative thereto about a vertical axis, said axle being adapted to carry selectively a pair of flanged railroad wheel rims and a pair of highway-type pneumatic tire holding rims, coupling means connected to said beam at said one end of the vehicle for connecting said vehicle to another vehicle of a railroad train, coupling means at the opposite end of said beam for connecting said beam to a wheeled railroad truck for supporting the opposite end of said vehicle on a railroad, and means for pivotally connecting said vehicle selectively to said truck and to a highway tractor.

4. A convertible highway-railroad vehicle comprising a semi-trailer including a frame, a beam extending longitudinally centrally of said trailer beneath said frame and on which said frame is supported, an axle mounted adjacent one end of the vehicle and pivotally connected to said beam for pivotal movement relative thereto about a vertical axis, said axle being adapted to carry selectively a pair of flanged railroad wheel rims and a pair of highway-type pneumatic tire holding rims, coupling means connected to said beam at said one end of the vehicle for connecting said vehicle to another vehicle of a railroad train, coupling means at the opposite end of said beam for connecting said beam to one end of a second beam forming part of a wheeled railroad truck adapted to support the opposite end of the vehicle on a railroad, fifth wheel means for pivotally connecting said vehicle selectively to said truck and to a highway trailer, and coupling means for connecting the opposite end of said second beam to another vehicle, said second beam being bent downwardly intermediate its ends to clear said fifth wheel means.

5. A convertible highway-railroad vehicle for transporting automotive vehicles comprising a frame which is constructed to have less road clearance at its rear end than at its front end, means for detachably engaging the front end of said vehicle selectively on a highway tractor and on a wheeled railroad truck, the wheels of said truck being flanged for use on a railroad, said truck having coupling means for connecting the front of said vehicle to a conventional railroad vehicle, means for permanently supporting the rear end of said vehicle comprising an axle carrying hubs at its opposite ends, each of said hubs being adapted to have secured thereto selectively a flanged rim of a railroad wheel and a highway-type pneumatic tire rim, the tread diameter of the wheels formed by mounting flanged rims on said hubs being less than the tread diameter of the flanged wheels of said truck, and coupling means at the rear end of said vehicle at lower height than the first-named coupling means for connecting said vehicle to the rear end of another similar vehicle, whereby the vehicle may be coupled to other similar vehicles in a railroad train by connecting the rear ends of two successive such vehicles together.

6. A convertible highway-railroad vehicle for transporting automotive vehicles comprising a semi-trailer having a frame which is constructed to have less road clearance at its rear end than at its front end, a beam extending longitudinally centrally beneath said frame for supporting the same, means for supporting said frame at its rear end comprising twin axles, means connecting said axles pivotally with said beam, a spring suspension between said connecting means and said axles, each axle having a hub at each of its opposite ends, and means for selectively securing a flanged railroad rim and a highway-type pneumatic-tire rim to each hub, and means for supporting said vehicle at its front end selectively on a highway tractor and a wheeled railroad truck, said truck having coupling means at standard height for connecting the front of said vehicle to a conventional railroad vehicle, and said truck comprising a second beam, means for detachably coupling said second beam to said first beam, twin axles, a spring suspension between said twin axles and said second beam, and flanged railroad wheels mounted on each of the last-named twin axles, the diameter of the flanged railroad wheels being greater than the diameter of the wheels formed by securing flanged railroad rims to the hubs of the first-named twin axles, and coupling means at the rear end of said vehicle at a lower height than the first-named coupling means for connecting said vehicle to the rear end of another similar vehicle, whereby the vehicle may be coupled to a similar automotive transport vehicle in a railroad train by coupling the rear ends of the two vehicles together, and may be coupled to a conventional railroad vehicle by coupling its front end to said conventional railroad vehicle.

7. A convertible highway-railroad vehicle comprising a semi-trailer having a frame, a beam extending longitudinally centrally beneath said frame to support said frame, a first bar mounted beneath said drawbar and transversely thereof, a second bar pivotally connected to the first bar beneath the same for pivotal movement relative thereto about a vertical axis, rollers mounted at opposite ends of the first bar to ride on the second bar, a pair of parallel axles, a hub journaled on antifriction bearings on each end of each axle, a spring suspension interposed between said second bar and said axles, antifriction bearings supporting said spring suspension at two spaced points on each of said axles between the two hubs of each axle, and means for removably securing to each hub selectively a flanged railroad rim and a highway-type pneumatic tire carrying rim.

8. A convertible highway-railroad vehicle comprising a semi-trailer having a frame, a beam extending longitudinally centrally beneath said frame, means for detachably securing said trailer at its front end selectively to a highway tractor and to a wheeled railroad truck, means for pivotally supporting the rear end of said vehicle comprising a pair of twin axles, a cross-bar pivotally connected to said beam beneath said beam for movement relative on said beam on a vertical axis, a spring suspension interposed between said axles and said cross-bar, hubs secured to opposite ends of each axle, means for selectively securing a flanged railroad rim and a highway-type pneumatic-tire carrying rim to each hub, a keeper secured beneath said beam forwardly of said axles, a lock member secured to said cross-bar forwardly of said axles and mounted to be movable laterally in said keeper, and a cooperating lock member mounted on said beam beneath said beam to be movable longitudinally of said beam into and out of engagement with the first-named lock member to hold the rear supporting means against pivotal movement or to allow said pivotal movement, respectively.

9. A convertible highway-railroad vehicle comprising a semi-trailer having a frame, a beam extending longitudinally centrally beneath said frame to support said frame, a first bar mounted beneath said beam transversely thereof, a second bar pivotally connected to said first bar beneath the same for pivotal movement relative thereto about a vertical axis, rollers mounted at opposite ends of the first bar to ride on the second bar, a pair of parallel axles, a hub journaled on antifriction bearings on each end of each axle, a spring suspension interposed between said second bar and said axles, other antifriction bearings juxtaposed respectively with said first-named antifriction bearings and supporting said spring suspension at two spaced points of each of said axles respectively between the two hubs of each axle, and means for removably securing to each hub selectively a flanged railroad rim and a highway-type pneumatic tire carrying rim.

References Cited in the file of this patent

UNITED STATES PATENTS

| | | |
|---|---|---|
| 1,067,744 | Lane | July 15, 1915 |
| 1,237,963 | Smith | Aug. 21, 1917 |
| 1,333,748 | Berry | Mar. 16, 1920 |
| 1,675,027 | Grady | June 26, 1928 |
| 1,727,715 | Kassler | Sept. 10, 1929 |
| 2,097,418 | Oelkers | Oct. 26, 1937 |
| 2,140,121 | Tompkins | Dec. 13, 1938 |
| 2,263,578 | Hickman | Nov. 25, 1941 |
| 2,310,989 | Oelkers | Feb. 16, 1943 |
| 2,635,559 | Nystrom et al. | Apr. 21, 1953 |
| 2,709,969 | Andert | June 7, 1955 |